US008861692B1

(12) United States Patent
Phelps et al.

(10) Patent No.: US 8,861,692 B1
(45) Date of Patent: Oct. 14, 2014

(54) WEB CALL ACCESS AND EGRESS TO PRIVATE NETWORK

(71) Applicant: Verizon Patent and Licensing Inc., Basking Ridge, NJ (US)

(72) Inventors: David E. Phelps, Colorado Springs, CO (US); Brian S. Badger, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/894,789

(22) Filed: May 15, 2013

(51) Int. Cl.
*H04M 15/00* (2006.01)
*H04M 5/00* (2006.01)
*H04M 3/00* (2006.01)
*G06F 9/00* (2006.01)
*G06F 15/16* (2006.01)
*G06F 17/00* (2006.01)
*H04M 3/523* (2006.01)

(52) U.S. Cl.
CPC ............... *H04M 15/39* (2013.01); *H04M 3/523* (2013.01)
USPC ................. 379/121.01; 379/265.01; 370/401; 726/12; 726/15

(58) Field of Classification Search
USPC ............. 379/112.08, 112.09, 114.01, 115.01, 379/121.01, 127.01, 265.01, 265.02, 309; 370/352, 354, 401; 726/2, 3, 4, 7, 12, 726/15
See application file for complete search history.

(56) References Cited

U.S. PATENT DOCUMENTS

| 8,611,509 B1* | 12/2013 | Basart et al. ............... 379/88.17 |
| 2007/0116223 A1* | 5/2007 | Burke et al. ............. 379/201.12 |
| 2014/0143837 A1* | 5/2014 | Fletcher et al. .................. 726/4 |

* cited by examiner

*Primary Examiner* — Binh Tieu

(57) ABSTRACT

A system may include a Web Real-Time Communication (WebRTC) backend server configured to receive a request for a Uniform Resource Identifier (URI) for a WebRTC call session requested by a browser application and generate the URI for the WebRTC call session; and a validation proxy configured to receive the URI from a WebRTC gateway and validate the URI with the WebRTC backend server. The WebRTC backend server may be receive a request to validate the URI from the validation proxy, determine whether the URI corresponds to a valid URI, and send a validation message to the validation proxy, if the received URI is valid. The validation proxy may generate a Session Initiation Protocol (SIP) message based on the received validation message and send the generated SIP message to a contact center services system to initiate a real-time call between the contact center services system and the browser application.

20 Claims, 11 Drawing Sheets

WEB CALL ACCESS AND EGRESS TO PRIVATE NETWORK

BACKGROUND INFORMATION

Various technologies exist for the delivery of voice communication over a network. For example, a provider of voice communication services may manage a network that may enable users to communicate via voice and/or video calls. A user may participate in voice communication by using a dedicated device, such as a telephone, or by using software dedicated for voice communication, such as Voice over Internet Protocol (VoIP) software. A common tool for accessing, processing, and navigating information on the Internet is a browser application. In order to enable voice and video communication in browser applications, an application programming interface (API), referred to as Web Real-Time Communication (WebRTC), has been developed.

DETAILED DESCRIPTION OF PREFERRED EMBODIMENTS

Figure 1:
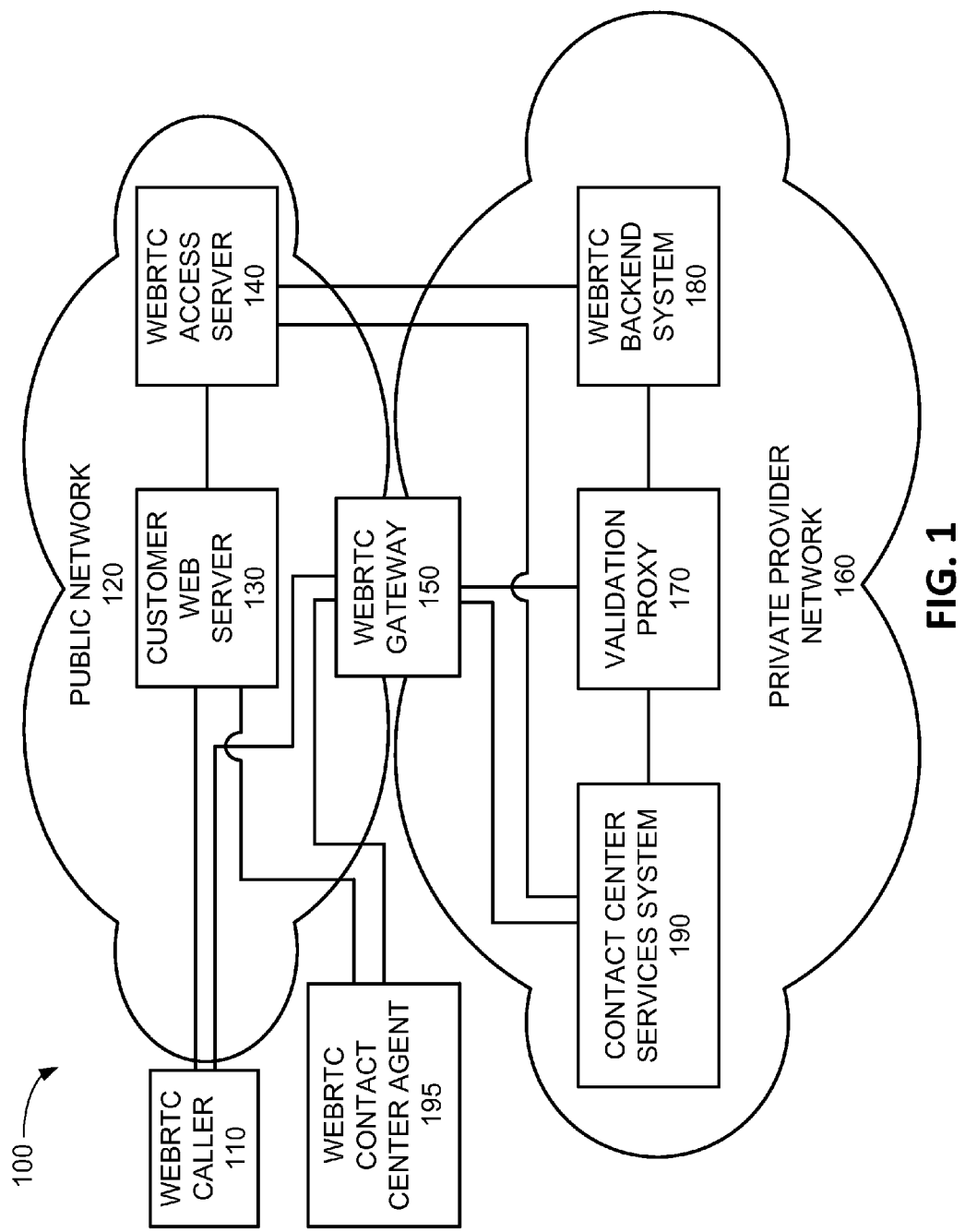
FIG. 1 is a diagram illustrating an exemplary environment according to an implementation described herein.

The following detailed description refers to the accompanying drawings. The same reference numbers in different drawings identify the same or similar elements.

Implementations described herein relate to Web call access and/or egress to a private network. A Web call may be initiated by a user by using a browser application (e.g., Mozilla Firefox, Microsoft Explorer, Google Chrome, Apple Safari, etc.) configured with Web Real-Time Communication (WebRTC) capability. A WebRTC enabled browser application may include a Web Application Programming Interface (API) that may interface with an audio and/or video application enabled for real-time communication. The Web API may interface with a WebRTC API. The WebRTC API may interface with real-time communication protocols (e.g., Extensible Messaging and Presence Protocol (XMPP), Real Time Protocol (RTP), Interactive Connectivity Establishment (ICE), Session Traversal Utilities for Network Address Translation (STUN), etc.) that may manage real-time connections with other devices across a network.

A company may enable users to initiate a WebRTC call via a web page accessible to a user. For example, a user may access the company's web page and may click on a button to activate a phone call to a customer representative. In response to clicking the button, the browser application may initiate a WebRTC call to a customer representative. While the company may enable direct connection of the WebRTC call from the user's browser application to the customer representative, such a direct connection may pose a number of problems. For example, providing a direct WebRTC connection to a customer representative may leave the company's web site vulnerable to a denial-of-service (DOS) event. If a large number of users click on the button within a particular time period, a network and/or phone system that handles customer service calls may be overwhelmed.

A DOS event may be prevented by using an authorization interface on a public server. For example, a caller connecting to a WebRTC gateway may be required to provide an account number and/or a password, and the WebRTC gateway may communicate with an authorization server (e.g., an OpenID server, an OAuth Server, a Diameter server, etc.) to validate the account number and password. However, a caller, such as a toll-free customer, may not have an account number and/or password and thus authorization of the caller may not be available. Rather, authorization may need to be performed on the called party, such as the company associated with a toll-free number.

As another example, the phone system that handles customer service calls may be hosted in a private network of a telephone services provider as a contact center services system. The company may pay for use of the contact center services system and may be charged for phone calls handled by the contact center services system. For example, a user may dial a toll-free number to speak with a customer representative, may be connected to the contact center services system, and the provider may charge the company for the telephone call. Thus, the provider may need to enable users to reach the contact center services system via WebRTC from a browser application and may need to determine how to charge the company for the telephone call.

A "customer," as the term is used herein, may refer to a customer, such as a company or a corporate client, of a provider of communication services. The provider of communication services may manage a private network that may host communication services, such as a contact center, for the customer. Implementations described herein relate to a system that prevents WebRTC denial-of-service events for a customer, that enables a customer to incorporate handling of WebRTC calls into a contact center hosted in the provider's private network, that enables the provider to track and bill WebRTC calls, and/or that enables the passing of call session data from a customer server to a contact center via a WebRTC call.

FIG. 1 is a diagram of an exemplary environment 100 in which the systems and/or methods described herein may be implemented. As shown in FIG. 1, environment 100 may include a WebRTC caller 110, a public network 120, a private provider network 160, and a WebRTC contact center agent 195.

WebRTC caller 110 may include any device with a browser application configured with WebRTC functionality. For example, WebRTC caller 110 may include a portable communication device (e.g. a mobile phone, a smart phone, a tablet computer, a global positioning system (GPS) device, and/or another type of wireless device); a personal computer or workstation; a server device; a portable computer; a television, a projector, a speaker, or another type of a display or audio output device; a set-top box; a gaming system; and/or any type of device with communication capability.

Public network 120 may include one or more circuit-switched networks and/or packet-switched networks. Public network 120 may include a local area network (LAN), a wide area network (WAN), a metropolitan area network (MAN), an ad hoc network, an intranet, the Internet, a fiber optic-based network, a wireless network, and/or any combination of these or other types of networks. Public network 120 may include a customer web server 130, a WebRTC access server 140, and a WebRTC gateway 150.

Customer web server 130 may include one or more computer devices, such as server devices, which host a web site associated with the customer. For example, customer web server 130 may include a web page with a WebRTC selection object, such as a call button, to enable a user to request to talk to a contact center agent. When a WebRTC call is requested by a browser application, in response to a user of WebRTC caller 110 pressing the call button, customer web server 130 may request a Uniform Resource Identifier (URI) from WebRTC access server 140 and provide the URI to the browser application. The URI may direct the browser application to a contact center via WebRTC gateway 150. Moreover, the request may include call session data that may be used by private provider network 160 to process the WebRTC call.

Furthermore, customer web server 130 may manage contact center agents. When a contact center request, to connect a call to a contact center agent, is received, customer web server 130 may select a contact center agent based on the requirements associated with the request, and may provide a URI to the contact center to direct the contact center to the selected contact center agent.

WebRTC access server 140 may include one or more computer devices, such as server devices, which enable customer web server 130 to communicate with a WebRTC backend system. For example, WebRTC access server 140 may receive a request for a WebRTC URI, may authenticate customer web server 130, may obtain the requested WebRTC URI from a WebRTC backend system, and may forward the obtained WebRTC URI to customer web server 130.

WebRTC gateway 150 may include one or more network devices that function as a gateway for provider network 160 with respect to WebRTC calls. For example, WebRTC gateway 150 may route WebRTC calls from public network 120 to private provider network 160 and may route calls from private provider network 160 to public network 120. WebRTC gateway 150 may convert an incoming WebRTC call to a Session Initiation Protocol (SIP) call, or to another type of call that is used within private provider network 160. Furthermore, WebRTC gateway 150 may convert an outgoing SIP call, or another type of call used within private provider network 160, into a WebRTC call in public network 120. WebRTC gateway 150 may apply one or more filter rules to determine whether a particular WebRTC call connection should be allowed into private provider network 160.

Private provider network 160 may include a private circuit-switched network and/or packet-switched network. Private provider network 160 may include a local area network (LAN), a wide area network (WAN), a metropolitan area network (MAN), an ad hoc network, an intranet, the Internet, a fiber optic-based network, a wireless network, and/or any combination of these or other types of networks. Private provider network 160 may include a validation proxy 170, a WebRTC backend system 180, and a contact center services system 190.

Validation proxy 170 may validate WebRTC URIs received from WebRTC gateway 150. For example, WebRTC gateway 150 may forward a WebRTC URI to validation proxy 170, validation proxy may send the WebRTC URI to WebRTC backend system 180, and may receive a validation message from WebRTC backend system 180. The validation message may include call session data and validation proxy 170 may add the call session data to the WebRTC call.

WebRTC backend system 180 may generate WebRTC URIs for WebRTC calls associated with private provider network 160 and may validate generated WebRTC URIs. WebRTC backend system 180 may interface with customer web servers 130 via WebRTC access server 140. WebRTC backend system 180 may receive a request for a WebRTC URI from customer web server 130 via WebRTC access server 140, may generate the WebRTC URI, and may forward the generated WebRTC URI to customer web server 130 via WebRTC access server 140. The generated WebRTC URI may, for example, direct a browser application running on WebRTC caller 110 to contact center services system 190. Furthermore, WebRTC backend system 180 may retrieve call session data from the received request, such as information identifying a caller, information relating to the caller, a reason for the call, etc. The retrieved call session data may be stored in connection with the generated WebRTC URI.

Still further, WebRTC backend system 180 may validate the generated WebRTC URI at a later time based on a request received from validation proxy 170. For example, WebRTC backend system 180 may determine whether the generated WebRTC URI is valid. A WebRTC URI may be valid when the WebRTC URI corresponds to a previously generated WebRTC URI and/or when the WebRTC URI satisfies one or more criteria, such as not being expired and not having been previously validated. WebRTC backend system 180 may generate a validation message in response to determining that the WebRTC URI is valid and may include any stored call session data in the validation message.

Contact center services system 190 may host contact center services for one or more customers of private provider network 160. For example, contact center services system 190 may include an Interactive Voice Response (IVR) platform, with or without Automatic Speech Recognition (ASR), which may request information from a caller and may direct the caller to a particular destination. Contact center services system 190 may run multiple instances of a platform, wherein each instance is associated with a particular customer. Different customers may be associated with different types, versions, subscriptions, and/or options configured for instances of contact center services system 190.

For example, contact center services system 190 may prompt the user to make one or more selections relating to the user's reason for calling or may prompt the user to provide identifying information. Alternatively, some or all of the information may be obtained by customer web server 130 and passed to contact center services system 190 as call session data included in the WebRTC call. Contact center services system 190 may perform one or more actions after obtaining information relating to the WebRTC call. For example, contact center services system 190 may park the call while a contact center agent is selected or made available, may direct the user to a voicemail system where the user can leave a message, and/or may connect the user to a contact center agent.

In some implementations, contact center services system 190 may generate a URI for an existing WebRTC call and may provide the generated URI to customer web server 130 via WebRTC backend system 180. The generated URI may be used to identify the WebRTC call and may be used to associate control actions, generated by customer web server 130, with the WebRTC call. Contact center services system 190 may receive an instruction to perform a control action from customer web server 130 via WebRTC backend system 180, may retrieve a URI from the received instruction, may identify a particular WebRTC call based on the retrieved the URI, and may perform the control action with respect to the identified WebRTC call based on the received instruction. Contact center services system 190 may send a response message back to customer web server 130, via WebRTC backend system 180, after the control action has been executed. Furthermore, contact center services system 190 may send a report message, associated with a particular WebRTC call, to customer web server 130 via WebRTC backend system 180.

Contact center services system 190 may be configured to receive telephone calls from callers using an Internet Protocol (IP) telephone device and/or callers using a time division multiplexing (TDM) telephone device (not shown in FIG. 1). Contact center services system 190 may further be configured to communicate with contact center agents, such as an IP contact center agent or a TDM contact center agent (not shown in FIG. 1). An IP contact center agent may include any device configured with VoIP functionality, such as a VoIP application. A TDM contact center agent may include any device configured for placing and/or receiving TDM telephone calls using a TDM network, such as such as a $2^{nd}$ generation or $1^{st}$ generation wireless network, a circuit-based legacy telephone network, and/or another type of TDM network.

Furthermore, contact center services system 190 may be configured to communicate with WebRTC contact center agents 195. WebRTC contact center agent 195 may include any device with a browser application configured with WebRTC functionality. For example, WebRTC contact center agents 195 may include a portable communication device (e.g. a mobile phone, a smart phone, a tablet computer, a global positioning system (GPS) device, and/or another type of wireless device); a personal computer or workstation; a server device; a portable computer; a television, a projector, a speaker, or another type of a display or audio output device; a set-top box; a gaming system; and/or any type of device with communication capability.

Contact center agents may be managed by customer web server 130. Thus, when contact center services system 190 determines that a contact center agent should be connected to the user making the WebRTC call (or to a user making an IP or a TDM call to contact center services system 190), contact center services system 190 may request a contact center agent URI from customer web server 130. Contact center services system 190 may receive the requested contact center agent URI and may contact WebRTC contact center agent 195 via WebRTC gateway 150 using the received contact center agent URI.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

For example, while FIG. 1 shows a single WebRTC caller 110, a single customer web server 130, a single WebRTC access server 140, a single WebRTC gateway 150, a single validation proxy 170, a single WebRTC backend system 180, a single contact center services system 190, and a single WebRTC contact center agent 195 for illustrative purposes, in practice, environment 100 may include multiple WebRTC callers 110, multiple customer web servers 130, multiple WebRTC access servers 140, multiple WebRTC gateways 150, multiple validation proxies 170, multiple WebRTC backend systems 180, multiple contact center services systems 190, and/or multiple WebRTC contact center agents 195.

Figure 2:
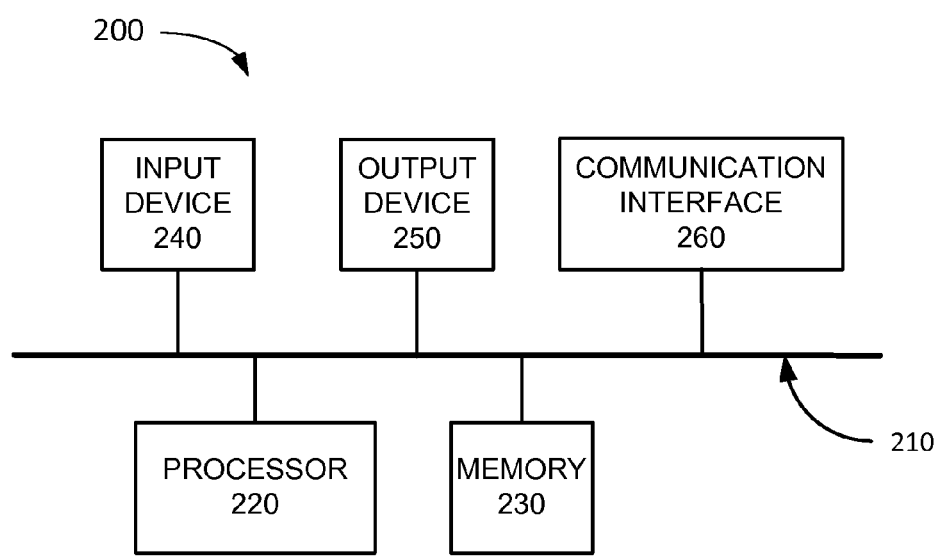
FIG. 2 is a diagram illustrating exemplary components of a device that may be included in one or more components of FIG. 1.

FIG. 2 is a diagram illustrating exemplary components of a device 200 according to an implementation described herein. WebRTC caller 110, customer web server 130, WebRTC access server 140, WebRTC gateway 150, validation proxy 170, WebRTC backend system 180, contact center services system 190, and/or WebRTC contact center agent 195 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to processing of WebRTC calls. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
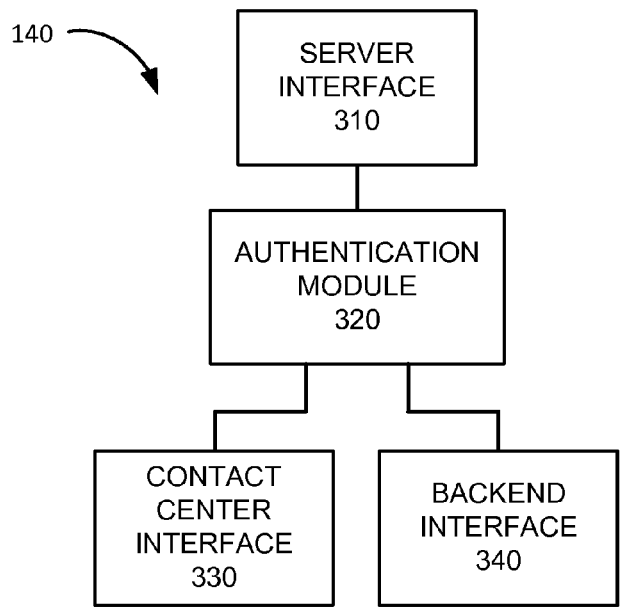
FIG. 3 is a diagram illustrating exemplary functional components of the access server of FIG. 1.

FIG. 3 is a diagram of exemplary functional components of WebRTC access server 140. The functional components of WebRTC access server 140 may be implemented, for example, via processor 220 executing instructions from memory 230. Additionally or alternatively, some or all of the functional components of WebRTC access server 140 may be hard-wired. As shown in FIG. 3, WebRTC access server 140 may include a server interface 310, an authentication module 320, a contact center interface 330, and a backend interface 340.

Server interface 310 may communicate with customer web servers 130. For example, server interface 130 may use a particular format and/or protocol for communicating with a particular customer web server 130. Furthermore, authentication module 320 may establish a secure connection with customer web server 130 by establishing a secure communication channel with customer web server 130.

Authentication module 320 may authenticate customer web server 130 when customer web server contacts WebRTC access server 140. For example, authentication module 320 may verify a digital signature associated with customer web server 130. Contact center interface 330 may communicate with contact center services system 190 and may establish a secure communication channel with contact center services system 190. Backend interface 340 may communicate with WebRTC backend system 180 and may establish a secure communication channel with WebRTC backend system 180.

Although FIG. 3 shows exemplary functional components of WebRTC access server 140, in other implementations, WebRTC access server 140 may include fewer functional components, different functional components, differently arranged functional components, or additional functional components than depicted in FIG. 3. Additionally or alternatively, one or more functional components of WebRTC access server 140 may perform functions described as being performed by one or more other functional components of WebRTC access server 140.

Figure 4:
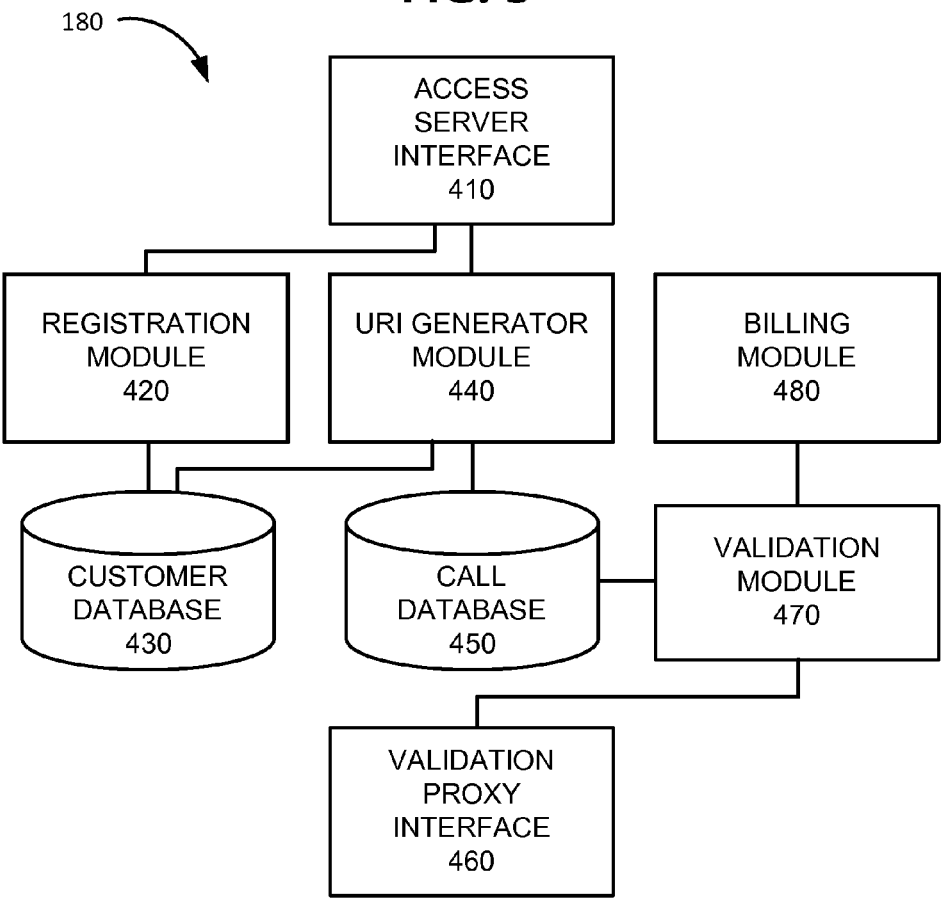
FIG. 4 is a diagram illustrating exemplary functional components of the backend system of FIG. 1.

FIG. 4 is a diagram of exemplary functional components of WebRTC backend system 180. The functional components of WebRTC backend system 180 may be implemented, for example, via processor 220 executing instructions from memory 230. Additionally or alternatively, some or all of the functional components of WebRTC backend system 180 may be hard-wired. As shown in FIG. 4, WebRTC backend system 180 may include an access server interface 410, a registration module 420, a customer database 430, a URI generator module 440, a call database 450, a validation proxy interface 460, a validation module 470, and a billing module 480.

Access server interface 410 may communicate with WebRTC access server 140 and may establish a secure communication channel with WebRTC access server 140. Registration module 420 may register a particular customer web server 130 with WebRTC backend system 180. For example, registration module 420 may receive a request to register customer web server 130, may configure an authentication procedure for customer web server 130 in connection with WebRTC access server 130, may obtain contact center specifications and/or URI generation specifications from customer web server 130, and/or may configure billing for WebRTC calls associated with customer web server 130. Customer database 430 may store the information relating to customer web server 130 that was obtained by registration module 420.

URI generator module 440 may generate a WebRTC URI for a WebRTC call requested by customer web server 130 based on information stored in customer database 430. The generated WebRTC URI may direct WebRTC caller 110 to contact center services system 190.

Call database 450 may store information relating to particular WebRTC calls associated with particular customer web servers 130. Exemplary information that may be stored in call database 450 is described below with reference to FIG. 7. Validation proxy interface 460 may communicate with validation proxy 170. Validation module 470 may process a request to validate a WebRTC URI received from validation proxy 170. Validation module 470 may either validate or reject a particular WebRTC URI based on information stored in call database 450. If a WebRTC URI is validated, validation module 470 may send a validation message to validation proxy 170 via validation proxy interface 460. The validation message may include call session data that was stored in call database 450.

Billing module 480 may process billing for a particular WebRTC call. As an example, billing module 480 may send information about the particular WebRTC call to a billing system (not shown). As another example, billing module 480 may include a particular number, such as a particular toll-free number, in a validation message sent by validation module 470, based on the particular customer associated with the validation message. The particular number may be used by contact center services system 190, and/or a billing system associated with contact center services system 190, to bill the customer for the WebRTC call. In other implementations, a different type of identifier may be used for billing, such as an enterprise identifier or a URI associated with customer web server 130.

Although FIG. 4 shows exemplary functional components of WebRTC backend system 180, in other implementations, WebRTC backend system 180 may include fewer functional components, different functional components, differently arranged functional components, or additional functional components than depicted in FIG. 4. Additionally or alternatively, one or more functional components of WebRTC backend system 180 may perform functions described as being performed by one or more other functional components of WebRTC backend system 180.

Figure 5:
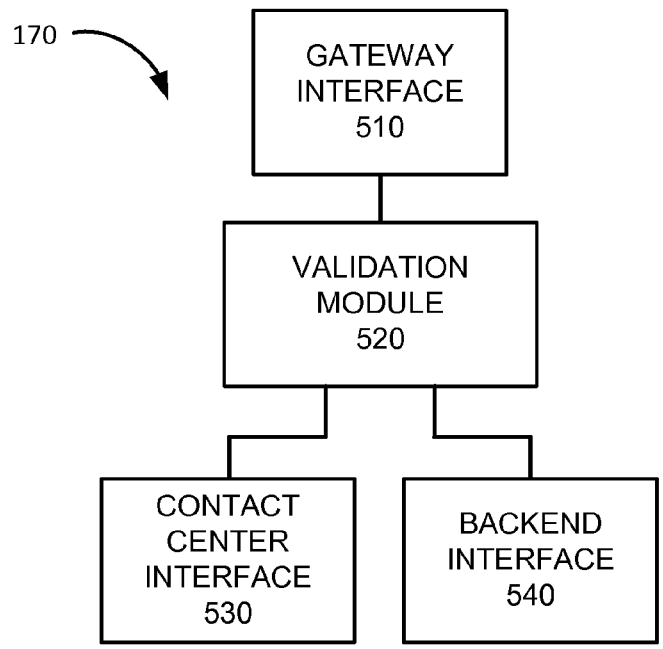
FIG. 5 is a diagram illustrating exemplary functional components of the validation proxy of FIG. 1.

FIG. 5 is a diagram of exemplary functional components of validation proxy 170. The functional components of validation proxy 170 may be implemented, for example, via processor 220 executing instructions from memory 230. Additionally or alternatively, some or all of the functional components of validation proxy 170 may be hard-wired. As shown in FIG. 5, validation proxy 170 may include a gateway interface 510, a validation module 520, a contact center interface 530, and a backend interface 540.

Gateway interface 510 may communicate with WebRTC gateway 150. For example, gateway interface 510 may receive calls incoming to contact center services interface 190 from WebRTC gateway 150. Validation module 520 may validate a WebRTC URI, associated with an incoming call, by generating a validation request and receiving a validation message in response. If a validation message is received, validation module 520 may generate a phone message, such as a Session Initiation Protocol (SIP) message to contact center services system 190. Furthermore, validation module 520 may populate the SIP message with call session data received via the validation message.

Contact center interface 530 may communicate with contact center services system 190. For example, contact center interface 530 may forward validated WebRTC calls to contact center services system 190. Backend interface 540 may communicate with WebRTC backend system 180. For example, backend interface 540 may send a request to validate a WebRTC URI to WebRTC backend system 180 and may receive a validation message from WebRTC backend system 180.

Although FIG. 5 shows exemplary functional components of validation proxy 170, in other implementations, validation proxy 170 may include fewer functional components, different functional components, differently arranged functional components, or additional functional components than depicted in FIG. 5. Additionally or alternatively, one or more functional components of validation proxy 170 may perform functions described as being performed by one or more other functional components of validation proxy 170.

Figure 6:
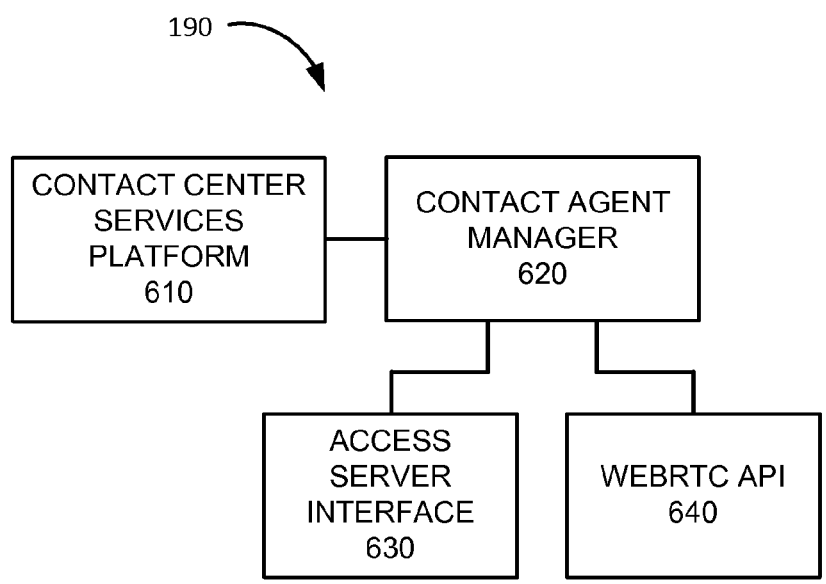
FIG. 6 is a diagram illustrating exemplary functional components of the contact center services system of FIG. 1.

FIG. 6 is a diagram of exemplary functional components of contact center services system 190. The functional components of contact center services system 190 may be implemented, for example, via processor 220 executing instructions from memory 230. Additionally or alternatively, some or all of the functional components of contact center services system 190 may be hard-wired. As shown in FIG. 6, contact center services system 190 may include a contact center services platform 610, a call agent manager 620, an access server interface 630, and a WebRTC API 640.

Contact center services platform 610 may include one or more instances of a contact center services platform associated with a particular customer. For example, contact center services platform 610 may include an Interactive Voice Response (IVR) platform, with or without Automatic Speech Recognition (ASR), which may request information from a caller and may direct the caller to a particular destination. Contact center services platform 610 may manage connections with contact center agents, such as IP contact center agents and/or TDM contact center agents. Contact center services platform 610 may also include a service routing component used for toll-free routing. The service routing component may be configured to route toll-free WebRTC calls.

Call agent manager 620 may manage connecting a caller to a WebRTC contact center agent. For example, when contact center services platform 610 determines that WebRTC caller 110 should be connected to a contact center agent, call agent manager 620 may secure a connection to a contact center agent. In some implementations, WebRTC contact center agents may not be available and call agent manager 620 may select a contact center agent using another technique. If WebRTC contact center agents are available, call agent manager 620 may request selection of a WebRTC contact center agent from customer web server 130.

Access server interface 630 may communicate with WebRTC access server 140. For example, access server interface 630 may receive an instruction from call agent manager 620 to obtain a WebRTC contact center agent URI from customer web server 130 via WebRTC access server 140. Access server interface 630 may obtain a WebRTC contact center agent URI from WebRTC access server 140 and provide the WebRTC contact center agent URI to call agent manager 620. Call agent manager 620 may contact the WebRTC contact center agent using the obtained WebRTC contact center agent URI via WebRTC API 640. WebRTC API 640 may establish and manage a WebRTC connection between contact center services system 190 and WebRTC contact center agent 195 using the obtained WebRTC contact center agent URI.

Although FIG. 6 shows exemplary functional components of contact center services system 190, in other implementations, contact center services system 190 may include fewer functional components, different functional components, differently arranged functional components, or additional functional components than depicted in FIG. 6. Additionally or alternatively, one or more functional components of contact center services system 190 may perform functions described as being performed by one or more other functional components of contact center services system 190.

Figure 7:
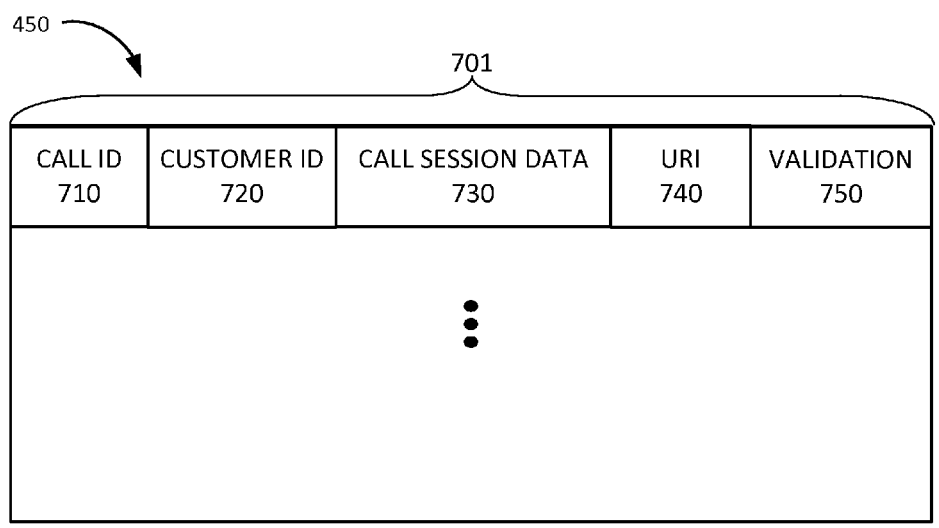
FIG. 7 is a diagram of exemplary information that may be stored in a call database according to an implementation described herein.

FIG. 7 is a diagram of exemplary information that may be stored in call database 450 according to an implementation described herein. As shown in FIG. 7, call database 450 may include one or more call records 701 (referred to herein collectively as "call records 701" and individually as "call record 701"). Each call record 701 may store information associated with a particular call session. Call record 701 may include a call identifier (ID) field 710, a customer ID field 720, a call session data field 730, a URI field 740, and a validation field 750.

Call ID field 710 may include an identifier (e.g., a string of characters) that uniquely identifies a particular WebRTC call initiated by WebRTC caller 110 and for which a WebRTC URI has been requested by customer web server 130. Customer ID field 720 may include an identifier that identifies a customer associated with the particular WebRTC call. For example, customer ID field 720 may store a customer account number or another identifier that may be used to bill the customer for WebRTC calls and/or that may be used by contact center services system 190 to identify a contact center instance associated with the customer.

Call session data field 730 may store call session information associated with the WebRTC call. As an example, call session data field 730 may include information associated with a caller, such as the caller's name, address, phone number, geographic location, account number, purchase history, subscription details, and/or any other information associated with a caller. As another example, call session data field 730 may store a reason associated with the call. As yet another example, call session data field 730 may store an indication that the caller has been flagged for a particular action. Moreover, call session data field 730 may store information associated with the customer, such as a particular toll-free number (or another type of identifier) that may be provided to contact center services system 190 to generate a bill for the WebRTC call.

URI field 740 may store a WebRTC URI assigned to the particular WebRTC call. As an example, WebRTC URI may be generated based on specifications associated with the particular customer, such as a URI of a particular contact center services platform 190 associated with the particular customer. As another example, WebRTC URI may include an identifier for a set of instructions stored by WebRTC gateway 150 to cause WebRTC gateway 150 to request a particular type of connection with WebRTC caller 110, such a particular type of secure tunnel.

Validation field 750 may store information about whether the URI stored in URI field 740 should be considered valid. As an example, the URI may be designated to be valid for a particular length of time after generation (e.g., 60 seconds) and may be deemed expired and invalid after the particular length of time has expired. As another example, the URI may only be validated once and after one validation, the URI may be designated as invalid.

Although FIG. 7 shows exemplary components of call database 450, in other implementations, call database 450 may include fewer components, different components, differently arranged components, or additional components than depicted in FIG. 7.

Figure 8:
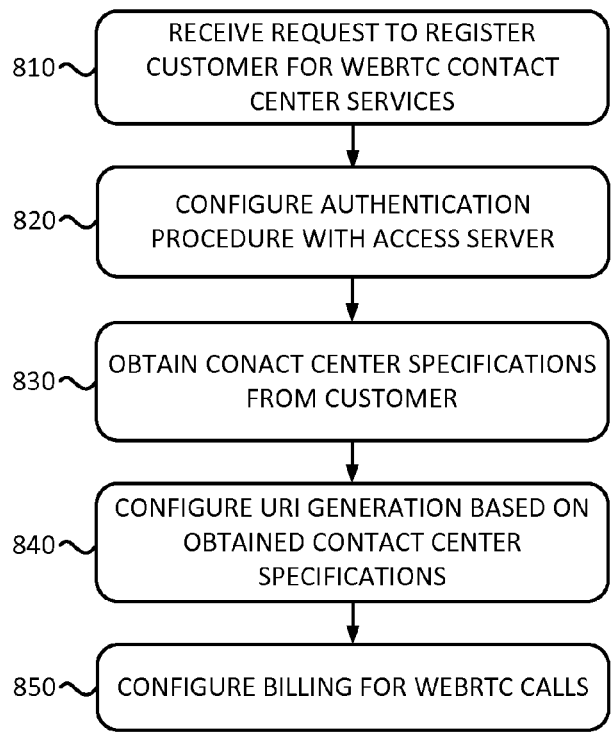
FIG. 8 is a flow chart of an exemplary process for registering a customer to use Web Real-Time Communication in a private network according to an implementation described herein.

FIG. 8 is a flow chart of an exemplary process for registering a customer to use Web Real-Time Communication in a private network according to an implementation described herein. In one implementation, the process of FIG. 8 may be performed by WebRTC backend system 180. In other implementations, some or all of the process of FIG. 8 may be performed by another device or a group of devices separate from WebRTC backend system 180 and/or including WebRTC backend system 180.

The process of FIG. 8 may include receiving a request to register a customer for WebRTC contact center services (block 810). For example, customer web server 130 may request to register with WebRTC backend system 180 via WebRTC access server 140. WebRTC backend system 180 may generate a new entry for the customer in customer database 430. An authentication procedure may be configured with an access server (block 820). For example, WebRTC backend system 180 may establish a digital signature for customer web server 130 and/or may establish generation of a secure communication channel between customer web server 130 and WebRTC access server 140 (e.g., by using a public key, private key encryption, etc.). In other implementations, the establishment of an authentication procedure may be performed by WebRTC access server 140.

Contact center specifications may be obtained from the customer (block 830) and URI generation may be configured based on the obtained customer specifications (block 840). For example, customer web server 130 may be associated with a particular contact center services system 190 or a particular instance running on contact center services system 190 and URI generation may be configured to include an address identifying the particular contact center services system 190 or the particular instance running on contact center services system 190.

Billing for WebRTC calls may be configured for the customer (block 850). As an example, registration module 420 may select a toll-free number (or another type of identifier) that may be provided to contact center services system 190 in order to bill a WebRTC call to the customer. As another example, registration module 420 may identify a billing account associated with the customer and may provide the billing account to billing module 480.

Figure 9:
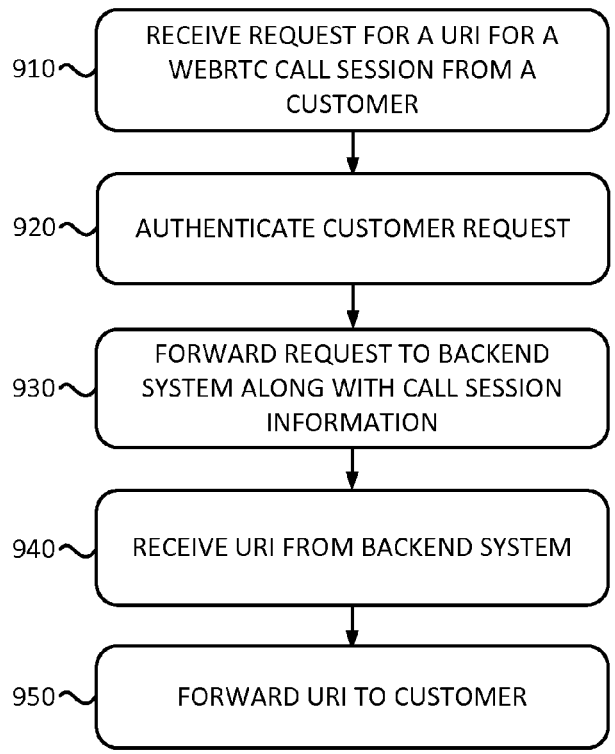
FIG. 9 is a flow chart of an exemplary process for processing a request for a Uniform Resource Identifier, associated with a Web Real-Time Communication call, according to an implementation described herein.

FIG. 9 is a flow chart of an exemplary process for processing a request for a Uniform Resource Identifier, associated with a Web Real-Time Communication call, according to an implementation described herein. In one implementation, the process of FIG. 9 may be performed by WebRTC access server 140. In other implementations, some or all of the process of FIG. 9 may be performed by another device or a group of devices separate from WebRTC access server 140 and/or including WebRTC access server 140.

The process of FIG. 9 may include receiving a request for a URI for a WebRTC call session from a customer (block 910). For example, a user of WebRTC caller 110 may access customer web server 130 using a browser application and may activate a WebRTC call by, for example, clicking on a button to request to talk to a customer representative. In response, customer web server 130 may contact WebRTC access server 140 to request a WebRTC URI for the user. Furthermore, customer web server 130 may obtain call session data and may forward the call session data along with the request. As an example, customer web server 130 may obtain information associated with the caller, such as the caller's name, geographic location, address, phone number, account number, purchase history, subscription details, and/or other information associated with the caller. The caller may be identified by prompting the caller for the information when the call is accessing customer web server 130, by having the caller log in and matching the caller's login information with an account number, by matching the caller's account to an identifier associated with WebRTC caller 110 (e.g., an IP address), and/or by using another technique.

As another example, the call session data may include information identifying a reason for the call. The reason may be obtained by prompting the user to enter a reason or to select a reason from a list or may be inferred based on the user's activity prior to activating the WebRTC call (e.g., based on the particular web page that the user was accessing). As yet another example, the call session data may include a flag to perform a particular action with respect to the caller. For example, customer web server 130 may identify an account associated with the caller, may determine that the caller has an account balance and may flag the caller to be connected to an account management contact center agent. As another example, customer web server 130 may select the caller for a promotion or a survey and may flag the caller to be connected to a promotion contact center agent or a survey contact center agent.

The customer request may be authenticated (block 920) and the request may be forwarded to a backend system along with call session information (block 930). For example, WebRTC access server 140 may authenticate customer web server 130 using an established authentication procedure and may forward the request, along with any call session data, to WebRTC backend system 180. A URI may be received from the backend system (block 940) and the URI may be forwarded to the customer (block 950). For example, WebRTC access server 140 may receive, in response to the sent request, a WebRTC URI from WebRTC backend system 180 and may forward the received WebRTC URI to customer web server 130. Customer web server 130 may provide the WebRTC URI to the browser application and the browser application may use the received WebRTC URI to initiate a WebRTC call to contact center services system 190 via WebRTC gateway 150.

In some implementations, the WebRTC URI may include an identifier for a set of instructions stored by WebRTC gateway 150. For example, the stored instructions may cause WebRTC gateway 150 to request a secure connection, or a particular type of secure connection, with WebRTC caller 110. Thus, the browser application of WebRTC caller 110 may establish a secure connection with WebRTC gateway 150 for the WebRTC call connection through public network 120.

Figure 10:
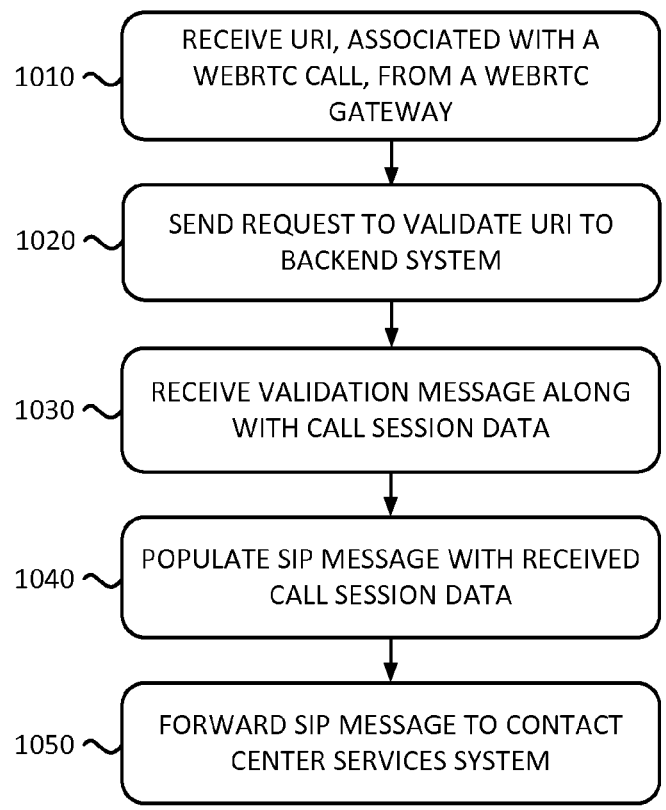
FIG. 10 is a flow chart of an exemplary process for validating a Web Real-Time Communication call according to an implementation described herein.

FIG. 10 is a flow chart of an exemplary process for validating a Web Real-Time Communication call according to an implementation described herein. In one implementation, the process of FIG. 10 may be performed by validation proxy 170. In other implementations, some or all of the process of FIG. 10 may be performed by another device or a group of devices separate from validation proxy 170 and/or including validation proxy 170.

The process of FIG. 10 may include receiving a URI, associated with a WebRTC call, from a WebRTC gateway (block 1010) and sending a validation request to validate the URI to a backend system (block 1020). For example, validation proxy 170 may receive a WebRTC URI from WebRTC caller 110 via WebRTC gateway 150 and may send the WebRTC URI to WebRTC backend system 180 with a request to validate the WebRTC URI.

A validation message, along with call session data, may be received (block 1030). For example, validation proxy 170 may receive a validation message from WebRTC backend system 180. The validation message may include call session data that was obtained by WebRTC backend system 180 from customer web server 130 via WebRTC access server 140. The call session data may include a toll-free number associated with the customer, may include information identifying the caller and/or other information associated with the caller, may include a reason for the call, may include an indication that a particular action should be taken by contact center services system 190.

A SIP message may be populated with the received call session data (block 1040) and the SIP message may be forwarded to a contact center services system (block 1050). For example, validation proxy 170 may generate a SIP INVITE message and may populate the SIP message with the received call session data. The SIP INVITE message may be sent to contact center session services 190. In other implementations, validation proxy 170 may generate another type of message to send to contact center session services system 190.

If WebRTC URI is not validated, validation proxy 170 may receive a rejection message from WebRTC backend system 180. If a rejection message is received from WebRTC backend system 180, the WebRTC call may be terminated and no message may be sent to contact center services system 190.

Figure 11:
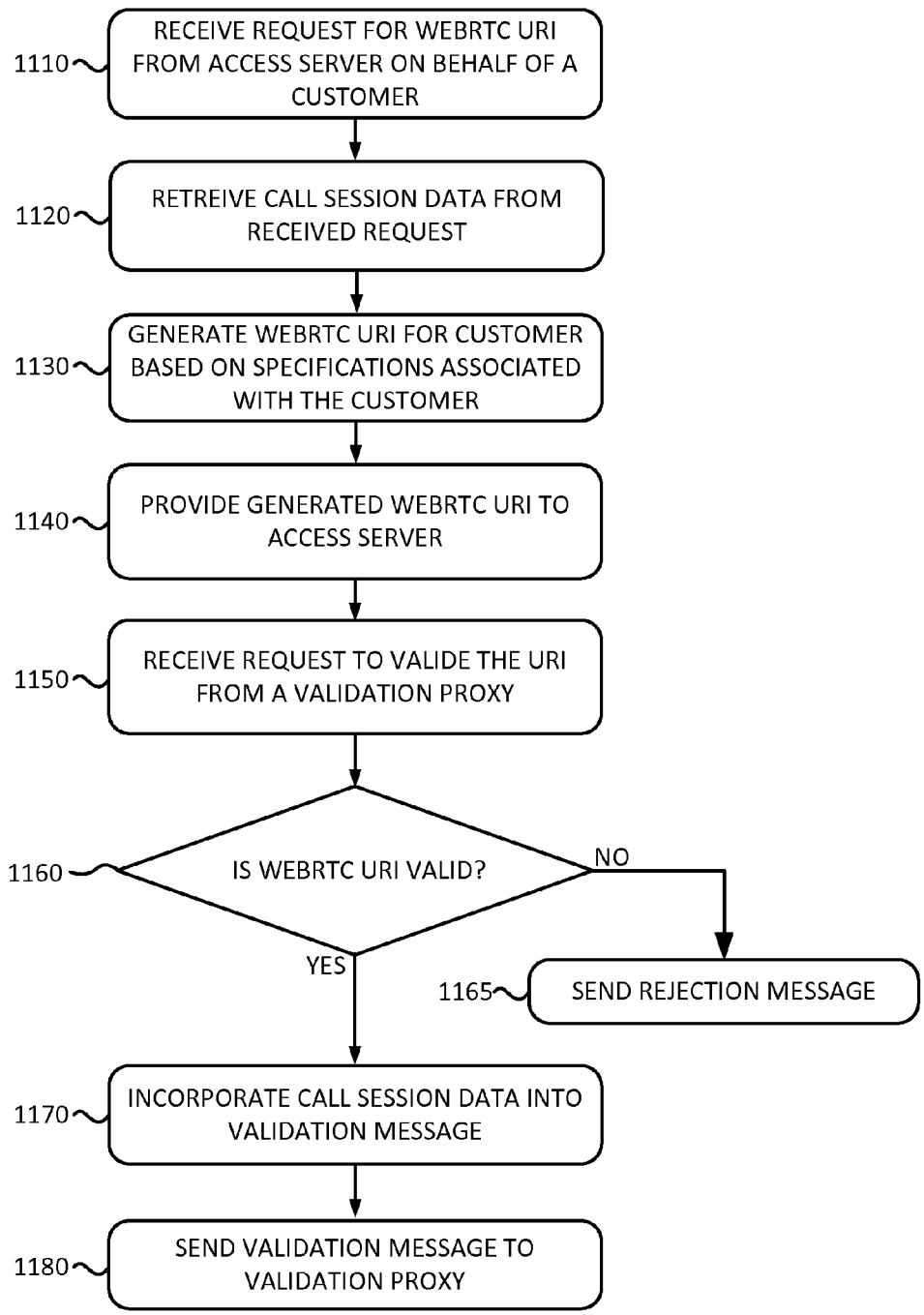
FIG. 11 is a flow chart of an exemplary process for processing a Web Real-Time Communication call according to an implementation described herein.

FIG. 11 is a flow chart of an exemplary process for processing a Web Real-Time Communication call according to an implementation described herein. In one implementation, the process of FIG. 11 may be performed by WebRTC backend system 180. In other implementations, some or all of the process of FIG. 11 may be performed by another device or a group of devices separate from WebRTC backend system 180 and/or including WebRTC backend system 180.

The process of FIG. 11 may include receiving a request for a WebRTC URI from an access server on behalf of a customer (block 1110). For example, WebRTC backend system 180 may receive a request from WebRTC access server 140, on behalf of customer web server 130, for a WebRTC URI for a WebRTC call initiated by a user from a browser application running on WebRTC caller 110. The request may include call session data.

Call session data may be retrieved from the received request (block 1120). For example, URI generation module 420 may retrieve, from the received request, information associated with the user, information relating to a reason for the call, an indication that the caller should be flagged for a particular action, and/or other types of call session data.

A WebRTC URI may be generated for the customer based on specifications associated with the customer (block 1130). As an example, URI generation module 420 may access customer database 430 to determine URI generation specifications associated with the customer, such as a domain name or another type of an address associated with a particular contact center services system 190. Thus, packets that include the WebRTC URI as a destination address may be routed to contact center services system 190. As another example, private provider network 160 may have particular security requirements for WebRTC calls coming in through public network 120. Thus, the generated WebRTC URI may include an identifier for a set of instructions stored by WebRTC gateway 150. The stored instructions may cause WebRTC gateway 150 to request a particular type of connection with WebRTC caller 110, such a particular type of secure tunnel.

URI generation module 420 may generate a new call record 701 and may store the generated WebRTC URI, along with the retrieved call session data, in the new call record 701. The generated WebRTC URI may be assigned a particular expiration time, after which the WebRTC URI ceases to be valid. The generated WebRTC URI may be provided to the access server (block 1140). For example, WebRTC backend system 180 may provide the generated WebRTC URI to WebRTC access server 140.

A request to validate the generated WebRTC URI may be received from a validation proxy (block 1150) and a determination may be made as to whether the WebRTC URI is valid (block 1160). For example, validation module 470 may receive a request to validate a WebRTC URI from validation proxy 170. Validation module 470 may access call database 450 and may identify a call record 701 associated with the WebRTC URI. Validation module 470 may determine whether the WebRTC URI is valid, based on validation field 750. If validation field 750 indicates that the WebRTC URI is still valid, a validation message may be generated.

If the WebRTC URI is determined to be invalid (block 1160—NO), a rejection message may be sent. For example, validation module 470 may send a rejection message to validation proxy 170 and validation proxy 170 may drop the WebRTC call. If the WebRTC URI is determined to be valid (block 1160—YES), call session data may be incorporated into a validation message (block 1170) and the validation message may be sent to the validation proxy (block 1180). For example, validation module 470 may add the call session data from call record 701 to a validation message and may send the validation message to validation proxy 170. The added call session data may include a customer ID identifying customer web server 130, a toll-free number (or another type of identifier, such as an enterprise ID, URI, etc.) associated with the customer that may be used for billing purposes, information associated with the caller (e.g., name, account number, etc.), a reason for the call, an indication flagging the user for a particular action (e.g., a particular type of contact center agent), and/or other types of call session data.

Figure 12:
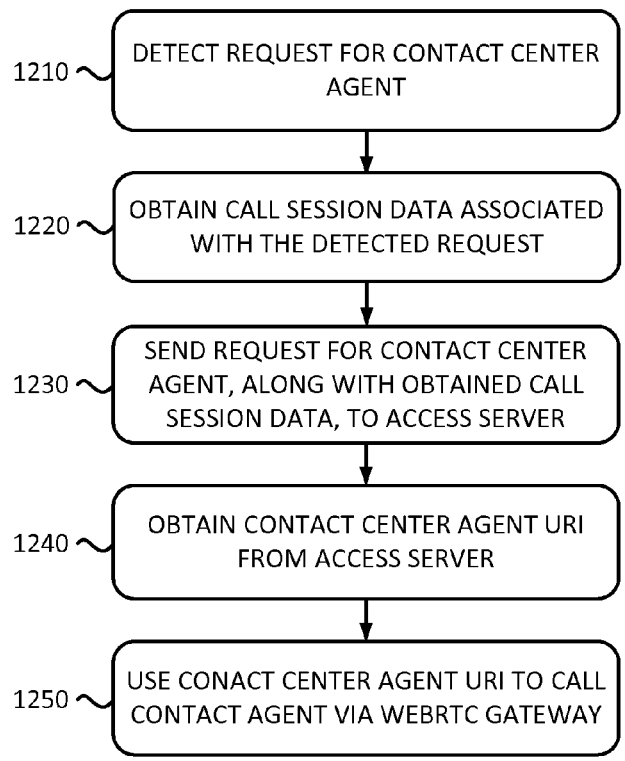
FIG. 12 is a flow chart of an exemplary process for contacting a Web Real-Time Communication agent according to an implementation described herein.

FIG. 12 is a flow chart of an exemplary process for contacting a Web Real-Time Communication agent according to an implementation described herein. In one implementation, the process of FIG. 12 may be performed by contact center services system 190. In other implementations, some or all of the process of FIG. 12 may be performed by another device or a group of devices separate from contact center services system 190 and/or including contact center services system 190.

The process of FIG. 12 may include detecting a request for a contact center agent (block 1210) and call session data, associated with the detected request, may be obtained (block 1220). For example, a process flow at contact center services platform 610 may determine that a WebRTC call (or another type of call, such as an IP call or a TDM call) should be connected to a particular type of contact center agent and may activate call agent manager 620 to secure a WebRTC call to the particular type of contact center agent. Contact center services platform 610 may provide call session data to call agent manager 620, such as information associated with the caller, information relating to the reason for the call, and/or any other information obtained by contact center services platform 610.

A request for the contact center agent, along with the obtained call session data, may be sent to an access server (block 1230). For example, call agent manager 620 may send a request to customer web server 130, via WebRTC access server 140, to obtain a contact center agent URI for the call. A contact center agent URI may be received from the access server (block 1240) and the received contact center agent URI may be used to call the contact agent via a WebRTC gateway (block 1250). For example, call agent manager 620 may obtain a WebRTC URI to call a selected contact center agent and may use WebRTC API 640 to call the selected contact center agent via WebRTC gateway 150.

Figure 13:
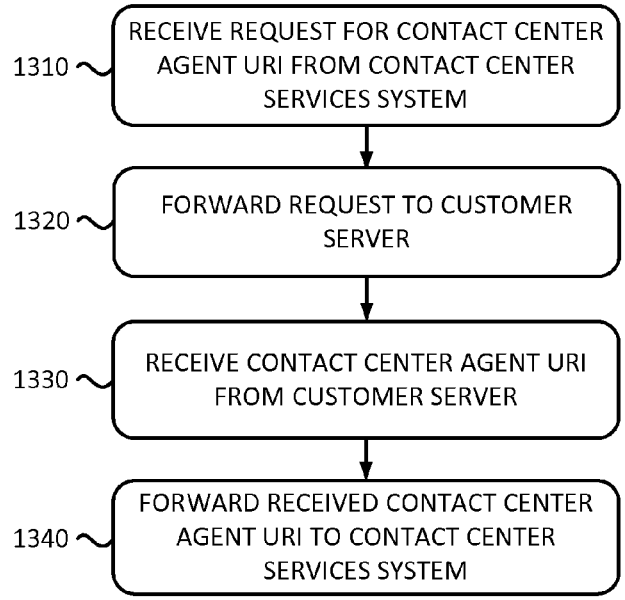
FIG. 13 is a flow chart of an exemplary process for processing a request for a Web Real-Time Communication agent according to an implementation described herein.

FIG. 13 is a flow chart of an exemplary process for processing a request for a Web Real-Time Communication agent according to an implementation described herein. In one implementation, the process of FIG. 13 may be performed by WebRTC access server 140. In other implementations, some or all of the process of FIG. 13 may be performed by another device or a group of devices separate from WebRTC access server 140 and/or including WebRTC access server 140.

The process of FIG. 13 may include receiving a request for a contact center agent URI from a contact center services system (block 1310) and the received request may be provided to a customer web server (block 1320). For example, WebRTC access system 140 may receive a request for a contact center agent URI. The request may include information identifying the customer, which may be used by WebRTC access system 140 to identify a particular customer web server 130 to which the request should be forwarded. Furthermore, the request may include call session data that may identify a particular type of contact center agent that should be selected (e.g., a billing department agent, a complaints department agent, etc.). The request may be forwarded to an identified customer web server 130.

A contact center agent URI may be received from the customer web server (block 1330) and the received contact center agent URI may be forwarded to the contact center services system (block 1340). For example, WebRTC access server 140 may receive the contact center agent URI and may forward the received contact center agent URI to contact center services system 190. Contact center services agent 190 may use the contact center agent URI to initiate a WebRTC call to the contact center agent via WebRTC gateway 150.

Figure 14:
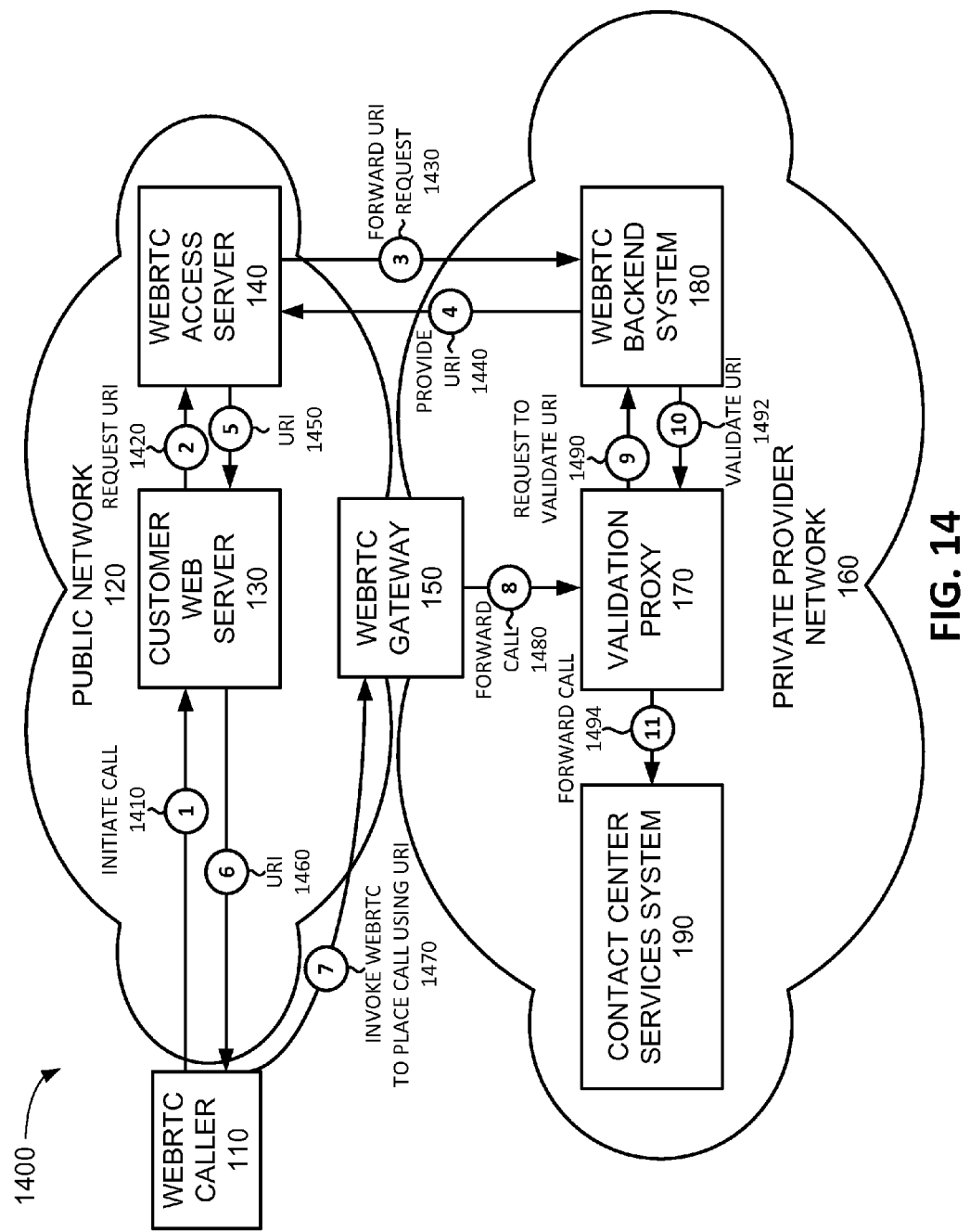
FIG. 14 is a diagram of a signal flow for a Web Real-Time communication access flow according to an implementation described herein.

FIG. 14 is a diagram of signal flow 1400 for a Web Real-Time communication access flow according to an implementation described herein. Signal flow 1400 may begin with a user of WebRTC caller 110 initiating a WebRTC call by clicking on a call button to talk to a customer representative, while accessing customer web server 130 via a browser application (signal 1410). In response, customer web server 130 may request a WebRTC URI from WebRTC access server 140 (signal 1420). WebRTC access server 140 may authenticate customer web server 130 and, if customer web server is successfully authenticated, may forward the request to WebRTC backend system 180 (signal 1430).

WebRTC backend system 180 may generate a WebRTC URI for the customer, based on specifications associated with the customer and stored in customer database 430. The generated WebRTC URI may include a domain name, or another type of address, associated with contact center services system 190. Thus, packets with a destination address based on the generated WebRTC URI may be routed to contact center services system 190. WebRTC backend system 180 may send the generated WebRTC URI to WebRTC access server 140 (signal 1440). WebRTC access server 140 may provide the received WebRTC URI to customer web server 130 (signal 1450) and customer web server 130 may provide the WebRTC URI to the browser application running on WebRTC caller 110 (signal 1460).

The browser application running on WebRTC caller 110 may invoke the WebRTC API to place a WebRTC call using the received WebRTC URI (signal 1470). The WebRTC URI may be used to route the call to WebRTC gateway 150, as the routing table of WebRTC gateway 150 may indicate that contact center services system 190 is reachable through WebRTC gateway 150. WebRTC gateway 150 may determine that contact center services system 190 is reachable through validation proxy 170, may convert the WebRTC call to a SIP call, and may forward the SIP call to validation proxy 170 (signal 1480). Validation proxy 170 may determine that the SIP call is associated with a WebRTC call that needs to be validated and may send the WebRTC URI to WebRTC backend system 180, along with a request to validate the WebRTC URI (signal 1490).

WebRTC backend system 180 may access call record 701 associated with the received WebRTC URI and may determine whether the WebRTC URI is valid. If no call record 701 can be found for the WebRTC URI, or if the call record 701 indicates that the WebRTC URI is no longer valid, WebRTC backend system 180 may send a rejection message and validation proxy 170 may drop the call. Assume the WebRTC URI is determined to be valid. WebRTC backend system 180 may retrieve call session data, associated with the call, from call record 701 and may include the call session data in a validation message that is sent back to validation proxy 170 (signal 1492). Validation proxy 170 may generate a SIP INVITE message to request a connection to contact center services system 190, may populate the SIP INVITE message with call session data included in the validation message, and may send the SIP INVITE message to contact center services system 190 (signal 1494). Contact center services system 190 may respond to the SIP INVITE message in order to open a call connection to WebRTC caller 110.

Figure 15:
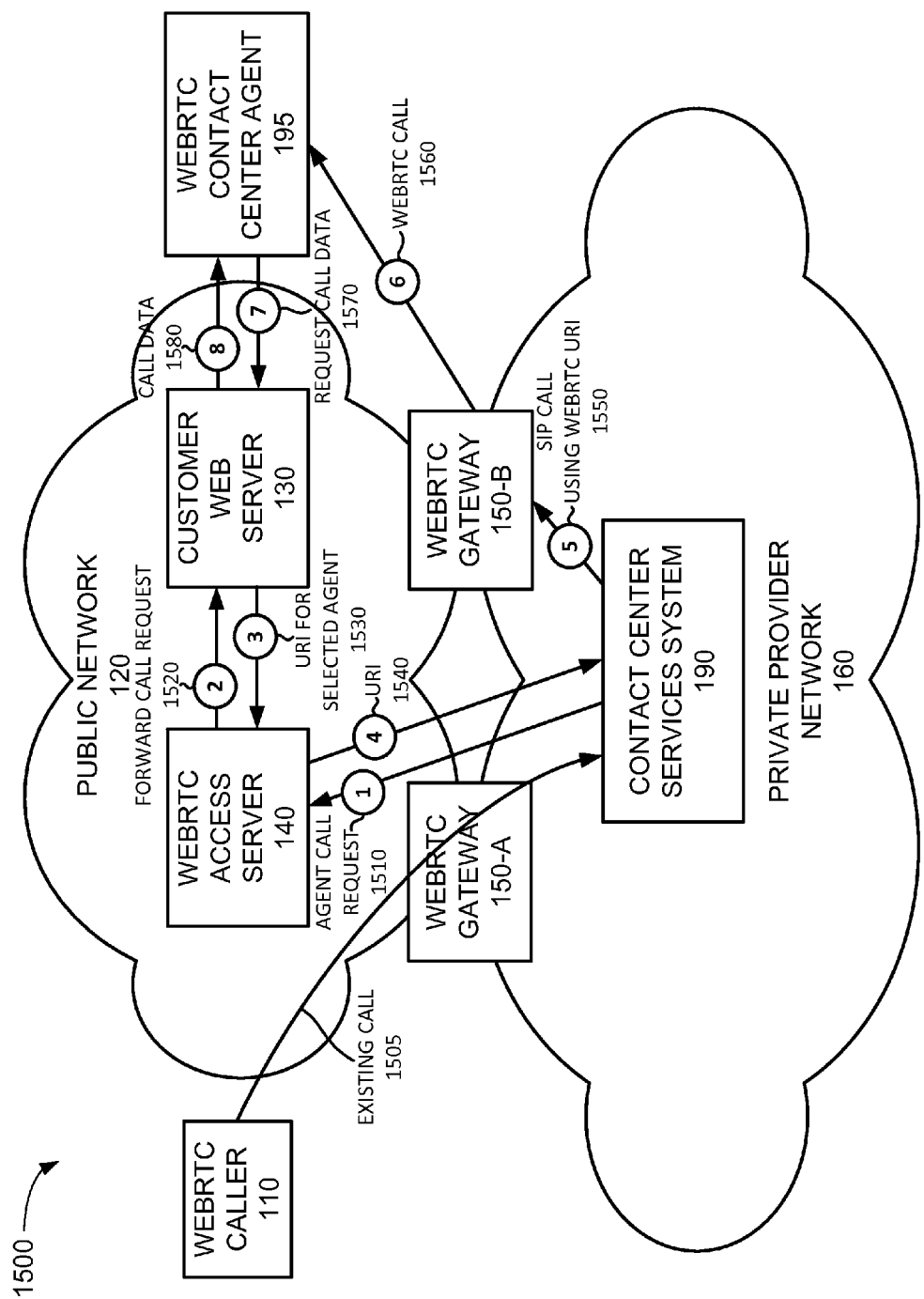
FIG. 15 is a diagram of a signal flow for a Web Real-Time communication egress flow according to an implementation described herein.

FIG. 15 is a diagram of a signal flow 1500 for a Web Real-Time communication egress flow according to an implementation described herein. An egress flow in this case refers to opening a connection from contact center services system 190 to an outside WebRTC contact center agent. Signal flow 1500 may begin with an existing WebRTC call being established between WebRTC caller 110 and contact center services system 190 via WebRTC gateway 150-A (signal 1505), such as a WebRTC call established using signal flow 1400 explained above with respect to FIG. 14. However, the existing call need not be a WebRTC call. Thus, signal flow 1500 may also be performed for an existing call that was established using another method, such as a SIP Voice over Internet Protocol (VoIP) call or a circuit-based TDM call.

Contact center services system 190 may determine that the existing call needs to be routed to a particular type of contact center agent (e.g., an account management agent, a troubleshooting agent, etc.). Contact center services system 190 may send a request to customer web server 130 for a WebRTC contact center agent URI via WebRTC access server 140 and WebRTC access server 140 may forward the request to customer web server 130 (signals 1510 and 1520). The request may include call session data, such as information associated with the caller, a reason for the call, and/or information identifying the particular type of contact center agent that is being requested.

Customer web server 130 may manage contact center agents and may identify and select an available contact center agent that is of the requested particular type of contact center agent. Customer web server 130 may determine a URI of the selected contact center agent and may send the contact center agent URI back to contact center services system 190 via WebRTC access server 140 (signals 1530 and 1540). Contact center services system 190 may initiate a SIP call to the selected contact center agent using the received URI. The SIP call may be routed through private provider network 160 to WebRTC gateway 150-B (signal 1550). WebRTC gateway 150-B may convert the SIP call to a WebRTC call and may use the URI to contact WebRTC contact center agent 195 to open a WebRTC call with WebRTC contact center agent 195 (signal 1560).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 8-13, the order of the blocks may be modified in other implementations. Further, non-dependent blocks may be performed in parallel. As another example, while a series of signal flows have been described with respect to FIGS. 14 and 15, the order of the signal flows may be modified in other implementations. Further, non-dependent signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   receiving, by the computer device, a request for a Uniform Resource Identifier for a Web Real-Time Communication call session from a Web Real-Time Communication access server;
   generating, by the computer device, the Uniform Resource Identifier for the Web Real-Time Communication call session;
   providing, by the computer device, the generated Uniform Resource Identifier to the Web Real-Time Communication access server;
   receiving, by the computer device, a request to validate the Uniform Resource Identifier from a validation proxy;
   determining, by the computer device, whether the received Uniform Resource Identifier corresponds to a valid Uniform Resource Identifier; and
   sending, by the computer device, a validation message to the validation proxy, in response to determining that the received Uniform Resource Identifier corresponds to a valid Uniform Resource Identifier, wherein the validation proxy is configured to forward calls to a contact center services system.

2. The method of claim 1, wherein generating the Uniform Resource Identifier for the Web Real-Time Communication call session includes:
   identifying a customer associated with the request;
   generating the Uniform Resource Identifier based on one or more associations associated with the identified customer;
   associating the generated Uniform Resource Identifier with the identified customer; and
   billing the customer for the Web Real-Time Communication call session, in response to sending the validation message to the validation proxy.

3. The method of claim 2, further comprising:
including information identifying a billing identifier in the validation message.

4. The method of claim 1, further comprising:
retrieving call session data based on the received request for the Uniform Resource Identifier for the Web Real-Time Communication call session; and
including at least some of the retrieved call session data in the validation message.

5. The method of claim 4, wherein the call session data includes at least one of:
a customer identifier that identifies a particular account associated with the contact center services system;
information identifying a caller associated with the Web Real-Time Communication call session;
information identifying a reason for the Web Real-Time Communication call session;
a billing identifier to be used for charging the customer for the call; or
information flagging the caller for a particular action at the contact center services system.

6. The method of claim 1, further comprising:
determining that the received Uniform Resource Identifier does not correspond to a valid Uniform Resource Identifier; and
sending, by the computer device, a rejection message to the validation proxy, in response to determining that the received Uniform Resource Identifier does not correspond to a valid Uniform Resource Identifier.

7. The method of claim 6, wherein determining that the received Uniform Resource Identifier does not correspond to a valid Uniform Resource Identifier includes:
determining that the received Uniform Resource Identifier has expired; or
determining that the received Uniform Resource Identifier has been previously validated.

8. The method of claim 1, wherein the generated Uniform Resource Identifier includes an identifier of an instruction to cause a Web Real-Time Communication gateway to instruct a browser application to use a secure communication method for the Web Real-Time Communication call session.

9. The method of claim 1, further comprising:
registering a customer for Web Real-Time Communication in connection with the contact center services system;
configuring an authentication procedure for an access server, associated with the computer device, for the customer; and
configuring billing for Web Real-Time Communication call sessions associated with the customer.

10. A computer device comprising:
logic configured to:
receive a request for a Uniform Resource Identifier for a Web Real-Time Communication call session from a Web Real-Time Communication access server;
generate the Uniform Resource Identifier for the Web Real-Time Communication call session;
provide the generated Uniform Resource Identifier to the Web Real-Time Communication access server;
receive a request to validate the Uniform Resource Identifier from a validation proxy;
determine whether the received Uniform Resource Identifier corresponds to a valid Uniform Resource Identifier; and
send a validation message to the validation proxy, in response to determining that the received Uniform Resource Identifier corresponds to a valid Uniform Resource Identifier, wherein the validation proxy is configured to forward calls to a contact center services system.

11. The computer device of claim 10, wherein, when generating the Uniform Resource Identifier for the Web Real-Time Communication call session, the logic is further configured to:
identify a customer associated with the request;
generate the Uniform Resource Identifier based on one or more associations associated with the identified customer;
associate the generated Uniform Resource Identifier with the identified customer; and
bill the customer for the Web Real-Time Communication call session, in response to sending the validation message to the validation proxy, by including information identifying a toll-free number in the validation message.

12. The computer device of claim 10, wherein the logic is further configured to:
retrieve call session data from the received request for the Uniform Resource Identifier for the Web Real-Time Communication call session; and
include at least some of the retrieved call session data in the validation message, wherein the call session data includes at least one of:
a customer identifier that identifies a particular account associated with the contact center services system;
information identifying a caller associated with the Web Real-Time Communication call session;
information identifying a reason for the Web Real-Time Communication call session;
a toll-free number to be used for charging the customer for the call; or
information flagging the caller for a particular action at the contact center services system.

13. The computer device of claim 10, wherein the generated Uniform Resource Identifier includes an identifier of an instruction to cause a Web Real-Time Communication gateway to instruct a browser application to use a secure communication method for the Web Real-Time Communication call session.

14. A system comprising:
a Web Real-Time Communication device configured to:
receive a request for a Uniform Resource Identifier for a Web Real-Time Communication call session requested by a browser application, and
generate the Uniform Resource Identifier for the Web Real-Time Communication call session;
a validation proxy configured to:
receive the Uniform Resource Identifier from a Web Real-Time Communication gateway, and
send a request to validate the Uniform Resource Identifier to the Web Real-Time Communication device;
wherein the Web Real-Time Communication device is further configured to:
receive the request to validate the Uniform Resource Identifier from the validation proxy,
determine whether the Uniform Resource Identifier corresponds to a valid Uniform Resource Identifier, and
send a validation message to the validation proxy, in response to determining that the received Uniform Resource Identifier corresponds to a valid Uniform Resource Identifier; and
wherein the validation proxy is further configured to:
generate a Session Initiation Protocol message based on the received validation message; and send the generated Session Initiation Protocol message to a contact center services system to initiate a real-time call between the contact center services system and the browser application.

15. The system of claim 14, further comprising:
a Web Real-Time Communication access server configured to:
   receive the request for a Uniform Resource Identifier for a Web Real-Time Communication call session from a customer server;
   authenticate the customer server;
   forward the request to the Web Real-Time Communication device, in response authenticating the customer server;
   receive the Uniform Resource Identifier for the Web Real-Time Communication call session from the Web Real-Time Communication device; and
   forward the Uniform Resource Identifier to the customer server, in response to receiving the Uniform Resource Identifier.

16. The system of claim 15, wherein the Web Real-Time Communication access server is further configured to:
   receive a request to contact a contact center agent from the contact center services system;
   forward the request to contact the contact center agent to the customer server;
   receive a contact center agent Uniform Resource Identifier from the customer server; and
   forward the received contact center agent Uniform Resource Identifier to the contact center services system.

17. The system of claim 14, wherein the Web Real-Time Communication device is further configured to:
   retrieve call session data from the received request for the Uniform Resource Identifier for the Web Real-Time Communication call session, and
   include at least some of the retrieved call session data in the validation message; and wherein the validation proxy is further configured to:
   populate the Session Initiation Protocol message using the at least some of the retrieved call session data.

18. The system of claim 17, wherein the call session data includes at least one of:
   a customer identifier that identifies a particular account associated with the contact center services system;
   information identifying a caller associated with the Web Real-Time Communication call session;
   information identifying a reason for the Web Real-Time Communication call session;
   a toll-free number to be used for charging the customer for the call; or
   information flagging the caller for a particular action at the contact center services system.

19. The system of claim 14, further comprising:
   the contact center services system, wherein the contact center services system is configured to:
   receive the Session Initiation Protocol message;
   identify a customer associated with the Web Real-Time Communication call session based on the Session Initiation Protocol message; and
   forward the Session Initiation Protocol message to a contact center services instance associated with the customer.

20. The system of claim 19, wherein the contact center services system is further configured to:
   detect a request for a contact center agent;
   obtain call session data associated with the detected request;
   send a request for a contact center agent to a Web Real-Time Communication access server, wherein the request for the contact center agent includes the obtained call session data;
   receive a Web Real-Time Communication access server from the Web Real-Time Communication access server; and
   contact the contact center agent using the received Web Real-Time Communication access server via a Web Real-Time Communication gateway.

* * * * *